Nov. 23, 1926.

R. C. BRADLEY

LIQUID METER

Filed April 1, 1922   3 Sheets-Sheet 2

1,608,231

INVENTOR
Richard C Bradley
BY Chapin & Neal
ATTORNEYS

Nov. 23, 1926.  
R. C. BRADLEY  
1,608,231  
LIQUID METER  
Filed April 1, 1922  3 Sheets-Sheet 3

INVENTOR  
Richard C. Bradley  
BY Chapin & Neal  
ATTORNEYS.

Patented Nov. 23, 1926.

1,608,231

UNITED STATES PATENT OFFICE.

RICHARD C. BRADLEY, OF NEW YORK, N. Y., ASSIGNOR TO S. F. BOWSER AND COMPANY, INCORPORATED, OF FORT WAYNE, INDIANA, A CORPORATION.

LIQUID METER.

Application filed April 1, 1922. Serial No. 548,690.

The present invention relates to liquid meters and more particularly to meters of the oscillating piston type in which an annular measuring chamber having a radial abutment is provided with a hollow piston which is slit longitudinally to straddle the abutment and which oscillates about a constantly changing fulcrum thereon as the center of said piston is constrained to revolve through a circular orbit concentric with the walls of the measuring chamber.

Meters of the above described general type operate upon the displacement principle, the piston serving, in conjunction with the radial abutment, to divide the measuring chamber into receiving and discharging spaces and operating to fill and empty the measuring chamber at each complete oscillation of the piston. To secure sensitiveness and reliability in the operation of such meters it is essential to eliminate, so far as possible, the frictional resistance to the movement of the piston. Furthermore to insure accuracy of measurement it is of the utmost importance that leakage of liquid between the piston walls and the walls of the measuring chamber shall be either avoided entirely or accurately compensated for if it is permitted to occur.

One object of the present invention is to provide a meter of the general character above referred to, having its parts so constructed and arranged as practically to eliminate all rubbing contact and wearing friction between the piston and the walls of the meter casing while avoiding leakage of the liquid between said parts.

With this object in view, the meter piston is carried by an axially disposed spindle that is mounted to turn in bearings eccentrically located upon a bearing-block while the latter, in turn, is carried by a spindle that is mounted to turn in fixed bearings. A measuring chamber and said parts are constructed and arranged to provide a clearance between the outer and inner walls of the piston and the opposed walls of the annular measuring chamber such as will insure against frictional contact between said piston and said walls but will be insufficient to permit leakage of liquid between said walls within certain limits of head pressure of the liquid. To positively insure against lateral or tilting displacement of the piston or bearing-block, such as would vary the amount of said clearance, both the piston spindle and the bearing-block spindle are mounted in vertically spaced-apart bearings. Preferably, in order to reduce friction to an absolute minimum the lower bearing for each spindle is a pivot bearing and the upper bearing for each spindle is a jewel bearing internally shaped to provide only a line contact with its spindle. This construction makes it practical to support both the piston and the bearing-block solely by their respective spindles and to maintain said piston and in perfect equilibrium while offering a minimum amount of frictional resistance to the movements thereof. By machining the parts with precision they may be assembled and adjusted so as to provide between the stationary measuring chamber walls and the moving piston and bearing-block, an actual clearance which will eliminate frictional resistance to the turning of the piston but which is so slight that within certain limits of head pressure of the liquid being measured, the viscosity of said liquid will prevent leakage from occurring between the proximate points of the piston and the measuring chamber walls. In other words, the movable parts may be so finely and accurately adjusted relatively to the stationary parts of the meter as to provide what may, for convenience of description, be termed a "non-leakable clearance" between them.

Another object of the invention is to provide means for compensating for leakage of the liquid being measured which may be caused by head pressure of said liquid in excess of the range of pressure within which no leakage is permitted to occur.

To this end a diaphragm is mounted in the wall of the meter casing which is responsive to variations of excess pressure and means is provided, which is actuated by movement of said diaphragm, to accelerate the movements of the registering mechanism as said pressure increases and to retard the movements of the registering mechanism as said pressure is reduced.

Other objects of the invention are to provide driving means for the registering mechanism so constructed and arranged as to reduce the load upon the piston of the meter; to insure that the piston will be maintained in perfect equilibrium of pressure during the operation of the meter; to so design both the movable and stationary parts of the meter as to reduce to a minimum any agitation or disturbance in the measuring chamber due to the operation of the meter and thereby to facilitate the smooth passage of the liquid through the measuring chamber; to reduce hydraulic friction upon the piston and bearing-block so as to enable the piston to move at the same velocity as the liquid passing through the meter and with substantially equal freeness; to facilitate the movement of the piston at that point in its travel when its center is nearest to the radial abutment; to provide means for relieving excess of pressure within the measuring chamber caused by the momentary cutting off of communication between the outer receiving compartment of the measuring chamber and the inlet port thereof; to provide improved means for avoiding the use of a stuffing-box for the passage through the meter casing of the driving shaft for the registering mechanism; and to provide means for automatically locking the driving gearing for the totalizing counters before resetting the registering devices thereby preventing the registration of the totalizing counters from being disturbed during the resetting operation.

With the above and other objects in view, as will hereinafter appear, the invention consists in the various features of construction and in the combination and arrangements of parts hereinafter described and claimed, the advantages of which will be apparent to those skilled in the art.

In the accompanying drawings illustrating what is at present considered to be the preferred embodiment of the invention.

Fig. 2 is a view, partially in plan and partially in horizontal section, of the meter;

Fig. 2ª is a perspective view of the radial abutment showing particularly the joint-forming projection thereon;

Referring to the drawings, an outer cylindrical casing or jacket 8 encloses an inner cylindrical casing 9 within which is formed the annular measuring chamber of the meter. The outer casing 8 is disposed with its axis vertical and the top of the casing is closed by a removable cover 10, the latter being secured in place by means of screws 11 which are threaded into an outwardly turned flange 12 at the top of the outer casing. A suitable gasket 13 is interposed between the cover 10 and the flange 12 to make the joint between them liquid tight, and a depending flange 14 on the cover encircles and protects the outer edges of the gasket 13 and the flange 12. At one side of the outer casing 8 is an inlet spud 15 while at a point in said casing diametrically opposite from the inlet spud is an outlet spud 16, said spuds being axially alined and externally screw-threaded for connection with the supply and delivery pipes (not shown). The outlet spud 16 projects from the wall of a delivery passage 17 (Fig. 5) which is formed upon the exterior of the casing 8 and which communicates with the interior of the latter through an outlet port 18 that is located above the top of the inner casing 9. The inner casing 9 is located in the upper portion of the outer casing 8 and rests upon a pedestal 20 rising from the base of the latter. As shown, an annular flange 21 projects from the top of the inner casing 9 and rests upon an annular rib 22 which projects inwardly from the cylindrical wall of the outer casing 8, and suitable screws 23 extend through said flange and are threaded into said rib to rigidly secure the inner and outer casings together. Within the inner casing 9 is the oscillating cylindrical piston which is indicated at 25. The piston 25, as shown, is hollow and is formed with a transverse dividing web 26 which is eccentrically mounted upon a cylindrical bearing-block or crank-disk 27 that is also mounted within said casing 9. In the lower portion of the outer casing 8, beneath the inner casing 9, is mounted certain gearing and driving connections, hereinafter described, for transmitting the rotation of the bearing-block 27 to the registering mechanism which is supported upon the outside of the casing 8 and is designated by the general reference numeral 28.

The inner casing 9 comprises a cylindrical shell 30 to which are secured, by means of screws 31, the top and bottom plates 32 and 33, respectively, the former being of greater diameter than the latter to provide the projecting annular flange already referred to. Cooperating with the shell 30 and the top and bottom plates 32 and 33 to form the annular chamber 35, is an inner cylindrical shell, concentric with the outer shell 30 and comprising superposed annular wall sections 36 and 37 (Fig. 1) the former depending centrally from the top plate 32 and the latter rising centrally from the bottom plate 33. The side wall of the piston 25 is confined within the annular measuring chamber 35 while the proximate end faces of the wall sections 36 and 37 of said chamber are spaced apart sufficiently to permit the working between them of the pistion web 26. Encircled by the lower annular wall section 37 is a recess 38 within which the bearing-block 27 is mounted.

To accommodate the width of the bearing-block 27 the recess 38 is extended within an axial projection 40 which depends from the bottom plate 33 and rests upon an internal shoulder 41 on the pedestal 20. The liquid to be measured is admitted to the measuring chamber 35 through an inlet port 43 in the bottom plate 33 and after being measured is discharged through an outlet port 45 in the top plate 32. The inlet and outlet ports 43 and 45 are arranged adjacent but at opposite sides of a radial abutment 46 with which the piston 25 cooperates to divide the annular measuring chamber 35 into receiving and discharging spaces or compartments. As shown, the abutment 46 extends from the outer shell 30 of the measuring chamber to the inner wall sections 36 and 37 and from bottom plate 33 to the top plate 32.

Figures 2, 2A:
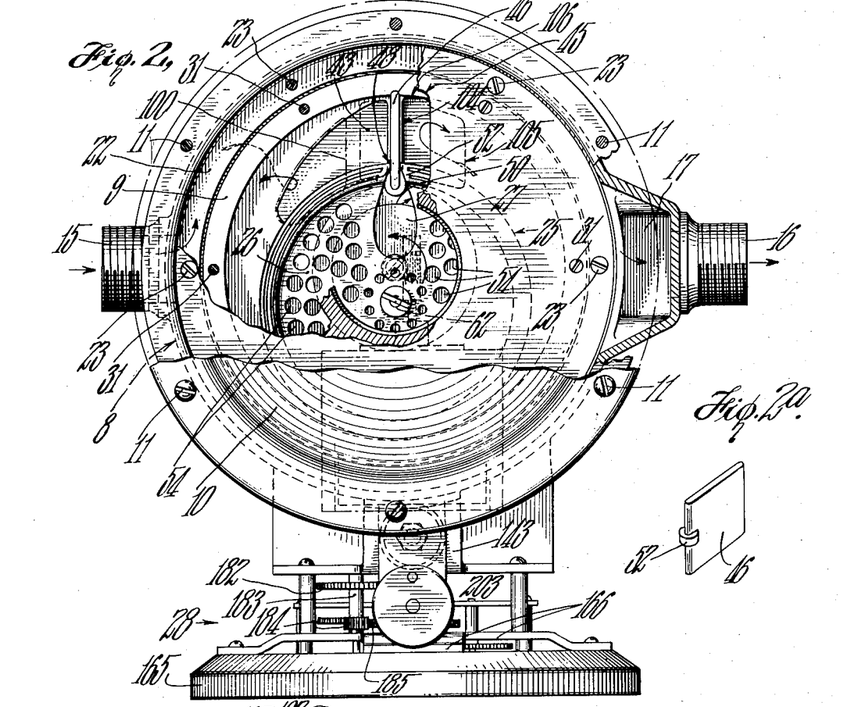

The cylindrical shell of the piston 25 is slit vertically at 48 to enable it to straddle the abutment 46, the slit 48 extending into the transverse web 26 in the form of a notch or throat 50. The edge of the piston web which defines the notch 50 is curved so that there will always be a liquid-tight contact between a portion of said edge and the circular edge face of a joint-forming projection 52 that is formed upon the abutment 46. This joint-forming projection 52 is formed integrally with the radial abutment 46, as best shown in Fig. 2ª, and said projection corresponds in thickness to the space intervening between the proximate end faces of the upper and lower annular wall sections 36 and 37. The piston web 26 is provided with a plurality of perforations 54 to permit a free upward passage of liquid through the measuring chamber.

To reduce the weight of the piston, and thereby to increase the sensitiveness of the meter, a series of holes 55 are drilled in the cylindrical shell of the piston. The holes 55 do not extend completely through the shell from bottom to top and as a result the upper ends of the holes are closed. The lower ends of the holes are closed by means of plugs 56 so that liquid is prevented from entering the holes and thus air bells are formed which help to offset the weight of the piston to reduce its inertia and momentum.

To eliminate rubbing contact between the piston and the walls of the measuring chamber as well as between the bearing-block and said walls and also between the piston web and the bearing-block, while avoiding leakage of liquid between said parts, within certain limits of head pressure, the piston and the bearing-block are mounted as follows: The piston 25 carries an axially disposed spindle 58 which is mounted in vertically spaced apart bearings 60 and 61 that are eccentrically located in the bearing-block or crank-disk 27 while the bearing-block is, in turn carried by a central spindle 62 that is mounted in vertically spaced-apart fixed bearings 63 and 64.

Figure 1:
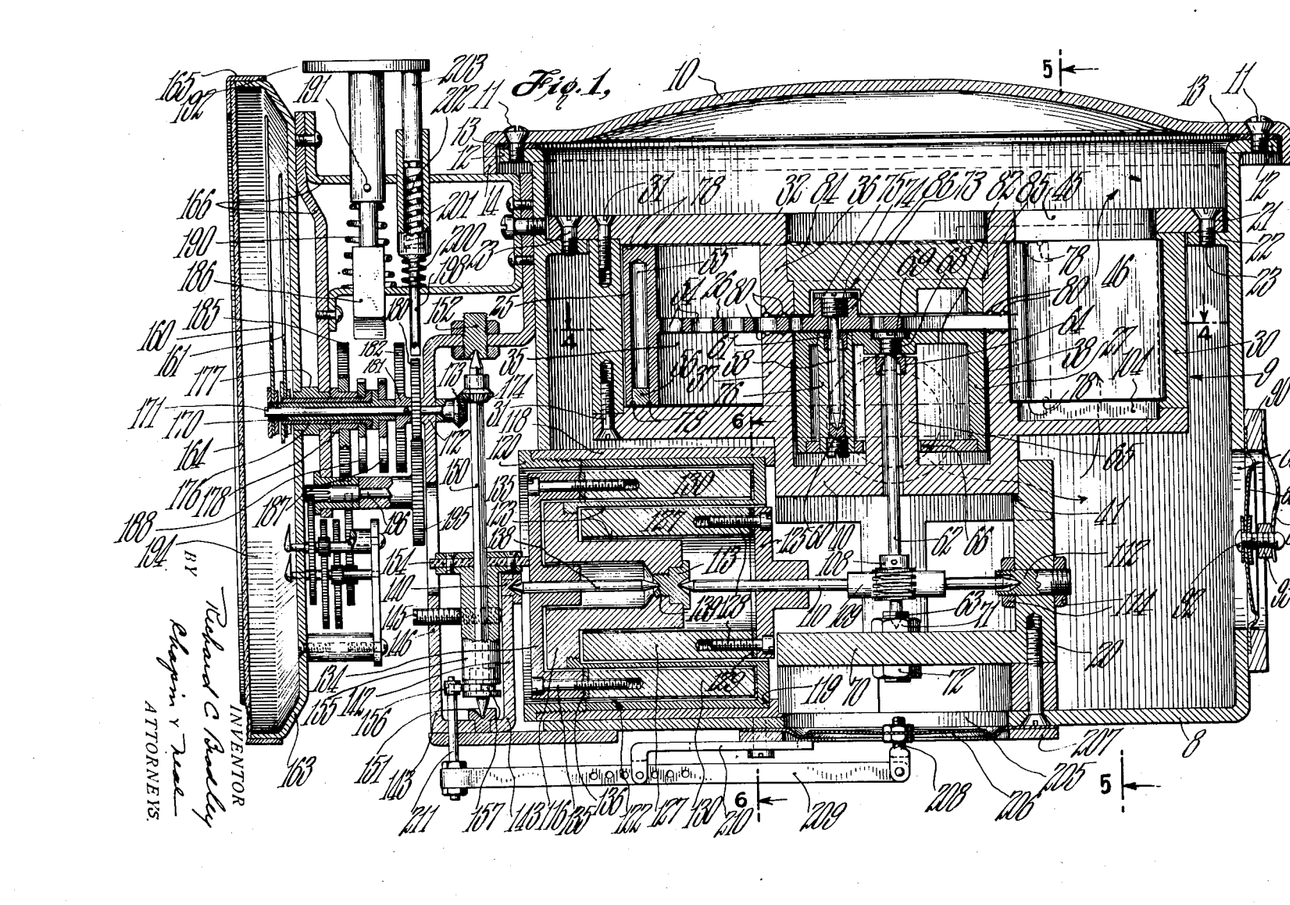
Fig. 1 is a view, in central vertical section, of the improved meter.

As shown in Fig. 1, the bearing-block 27 is hollow and its spindle 62 depends from the upper end wall thereof and extends through a sleeve 65 that rises from the base of the axial projection 40 of the measuring chamber casing, said sleeve extending through a central aperture 66 in the lower end wall of the hollow bearing-block 27 and supporting the upper bearing 64. At its upper end the bearing-block spindle 62 is provided with an enlarged shank portion 68 which is screw-threaded into a central aperture in the upper end wall of the bearing-block, and a head 69 which is located in a countersunk recess in the upper face of said end wall. As shown, the central portion of the upper end wall of the bearing-block is thickened on its inner side so that the threaded shank portion of the spindle 62 may be firmly secured therein. The lower end of the spindle 62 is of conical form and is received in a conical recess in the lower bearing member 63, thus affording a pivot bearing which supports the weight of the bearing-block and the piston 25. The bearing member 63 is externally screw-threaded and extends through a transverse web 70 in the pedestal 20 and is rigidly secured to said web with provision for vertical adjustment by means of two nuts 71 and 72 which bear against the top and bottom faces, respectively, of said web. By turning the nuts 71 and 72 the lower bearing member 63 may be readily adjusted to take up for wear or to adjust the clearance between certain parts of the piston and the adjacent portions of the measuring chamber casing.

The spindle 58 of the piston 25 depends from the transverse web 26, the upper portion of said spindle extending through a central aperture in said web and having an enlarged and screw-threaded shank portion 74 and a head 75. The shank portion is screwed into a recessed central boss 73 on the upper face of the piston web. The spindle 58 extends loosely through a vertical sleeve 76 the opposite ends of which are rigidly secured in the upper and lower end walls of the bearing-block. The bearing 61 is mounted in the upper end of the sleeve 76 while the bearing 60 is screw-threaded into the lower end of said sleeve and is formed with a conical recess for the conical lower extremity of the spindle 58 so that a pivot bearing is provided for supporting the weight of the piston.

The piston 25 and the bearing-block 27 are so proportioned and arranged with respect to each other and to the adjacent wall portions of the measuring chamber casing that both the piston and the bearing-block are supported solely by their respective piston spindles so that no portions of said piston or block, other than said spindles and those portions of the piston which necessarily contact with the radial abutment 46, are permitted to frictionally contact with any other part of the meter at any time during its operation. In other words an actual clearance is always maintained between the adjacent parts just referred to and said parts are so accurately and finely machined and so carefully adjusted during their assembly that the clearance between the cylindrical walls, both of the piston and bearing-block and the adjacent wall portions of the casing 9, while sufficient to avoid rubbing contact and wearing friction is nevertheless so slight as to insure against leakage therethrough of the liquid being measured within certain limits of head pressure of said liquid.

The clearance provided between the upper and lower end faces of the piston shell and the top and bottom plates 32 and 33, respectively, while substantially the same as that between the cylindrical walls of the piston and casing, does not require quite as fine and accurate adjustment as the latter since an effective liquid seal is provided for insuring against leakage past the end faces of the piston shell. To establish such a seal both the end faces of the piston shell are provided with one or more shallow grooves 78 which are concentric with the piston walls and which become filled with the liquid which is being measured and thus provide a liquid barrier effectively obstructing the flow of liquid across the groove faces. As shown clearly in Fig. 4, the grooves 78 are closed at their ends adjacent the slit 48 in the piston, to prevent the sealing liquid from escaping from the grooves at these points.

Sealing grooves 80 similar to the grooves 78 are provided in the free end faces of the annular wall sections 36 and 37 between which moves the piston web 26. These grooves 80 also become filled with liquid and provide an effective seal which prevents leakage of liquid between the piston web and said grooved faces.

It will be seen that with the above described construction and arrangement of parts practically the only frictional resistance to the movements of the piston and bearing-block is found in the bearings for the spindles which support these parts. The lower bearings 60 and 71 are hardened pivot bearings, while each upper bearing 61 and 64 is formed of a jewel so shaped internally as to provide only a circular line contact with the spindle and thus the friction against the piston and bearing block spindles is reduced to a minimum.

By making the bearing-block hollow, as above described its inertia is diminished thus adding to the sensitiveness of the meter. When the meter is in use the liquid, which fills the interior of the outer casing 8, will flow upwardly through the clearance space between the spindle 62 and the inner wall of the sleeve 65 and will gradually work through between the spindle and the jewel bearing 64 and pass into the interior of the hollow bearing-block and thence into the recess or chamber 38 in which said block rotates. Obviously as the liquid gradually rises in the chamber 38 and in the interior of the bearing-block a quantity of air will be trapped in the latter space unless some outlet is provided through which the air may escape. It would be undesirable to have a body of air imprisoned within the bearing-block inasmuch as the buoyance of the imprisoned air would exert an upward pressure upon the block and piston tending to disturb the fine adjustment of clearance spaces between said members and the adjacent portions of the measuring chamber casing. To avoid this undesirable condition, one or more vent holes 82 are provided in the upper wall of the bearing-block.

It will be seen that as the meter operates, the liquid within the bearing-block 27 and the recess 38 will offer little or no substantial amount of resistance to the movement of the smooth cylindrical surfaces of the bearing-block shell or to the movement of the flat faces of the upper and lower end walls of the bearing-block. The imprisoned liquid will rotate more or less with the bearing-block, but it will be seen that the smooth cylindrical faces of the sleeve 65 and of the inner wall of the recess 38 and also the smooth flat face of the base of said recess will not resist the movement of the liquid to any appreciable extent. The gap between the inner edge face of the lower wall of the bearing-block and the exterior of the sleeve 65 is very narrow to avoid undue commotion of the liquid at this point and all projecting parts such as would tend to produce agitation of the liquid have been eliminated. The greater part of the recess above the piston web and within the upper wall section 36 is filled by means of a plug 84 which is driven into said recess until an annular shoulder 85 upon the plug is brought into engagement with a corresponding shoulder on said wall section. The lower face of the plug 84 is provided with an annular groove 86 in which the boss 73 on the piston web rotates. This construction reduces the liquid space above the piston web to a minimum and thus eliminates to a large extent the agitation of churning of the liquid in this area as the piston oscillates.

With the above described construction, it will be understood that the axis of the piston spindle is constrained to travel through a circular orbit about the rotational axis of the bearing-block and that while the axis of the piston spindle thus travels, the piston itself oscillates about a constantly changing fulcrum on the radial abutment 46. It will also be seen that in all positions of the piston there will be a zone of non-leakable clearance between the exterior of the piston and the adjacent portion of the wall of the measuring chamber. Thus by virtue of the piston wall, the radial abutment 46 and the above-mentioned zone of non-leakable clearance, the measuring chamber is divided into inner and outer measuring sectors or compartments part of which are in communication with the inlet port 43 and part of which are in communication with the outlet port 45. For convenience of description, those measuring sectors which are in communication with the inlet port, and hence with the supply of liquid under pressure will be termed the receiving or high pressure sectors, while those measuring sectors which are in communication with the outlet port 45 will be termed the discharging or low pressure sectors or compartments. For example, when the piston is in the position illustrated by Fig. 7, A and B are the receiving or high pressure sectors and C and D are the discharging or low pressure sectors. The sectors A and D may also be referred to as the "outer" sectors because they are outside of the piston while the sectors B and C may be referred to as the "inner" sectors because they are inside of the piston. It will be understood that the inner receiving sector B and the inner discharging sector C are divided by the piston web into upper and lower portions which are nevertheless in communication with one another through the perforations in the web. While the liquid continues to flow through the meter, the piston is driven constantly in the same direction (which is counter-clockwise, viewing Fig. 2) and the several measuring sectors are continuously enlarging or contracting so that the liquid always has free flow through the meter.

Figures 4, 5, 6, 7, 8, 9:
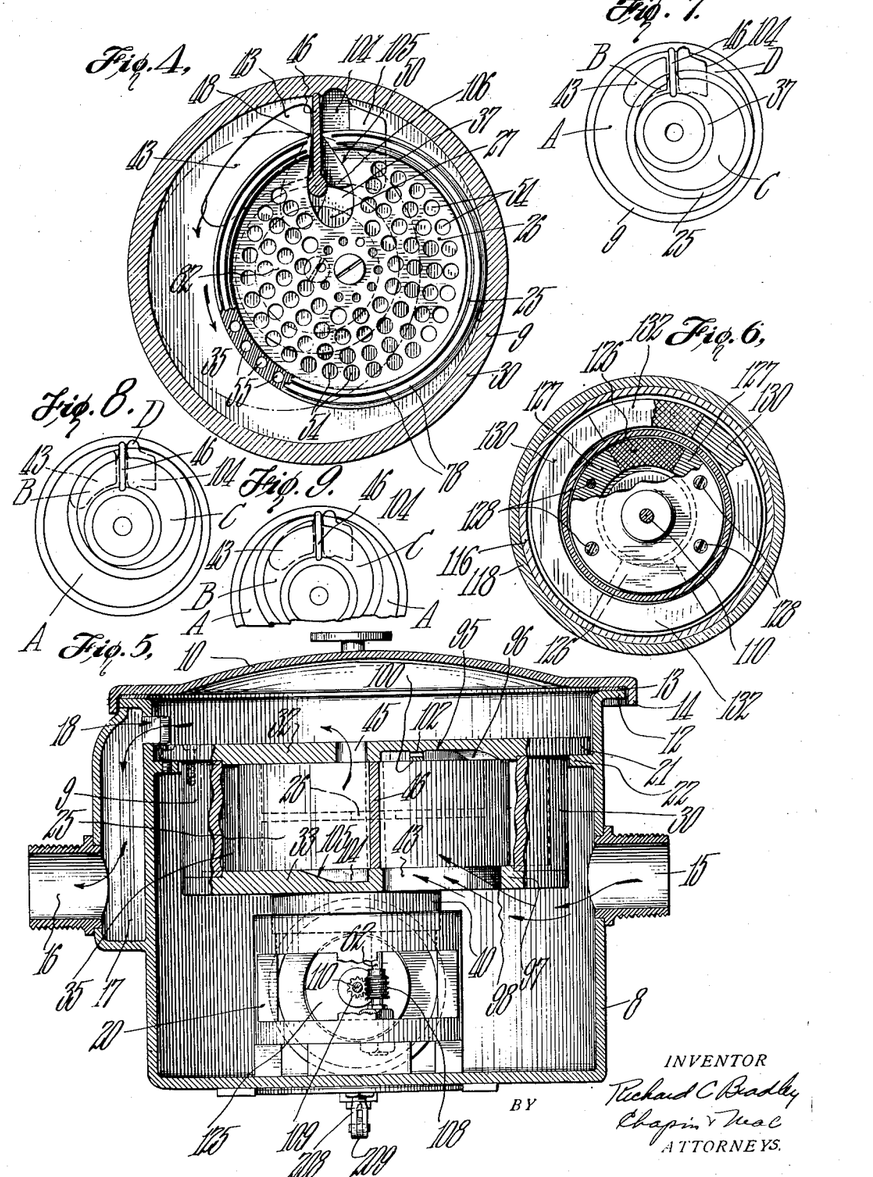
Figs. 4, 5 and 6 are sectional views taken substantially along the lines 4—4, 5—5 and 6—6 of Fig. 1, the parts of Figs. 4 and 6 being viewed as if turned 90° relatively to the position shown in Fig. 1.
Figs. 7, 8 and 9 are somewhat diagrammatic views, on a reduced scale, taken through the measuring chamber of the meter showing different positions of the piston.

In the present meter, as in prior art meters of this general type, there is a point in each cycle of movement of the piston where the piston encounters a slightly greater amount of resistance to its travel than at any other point. This point of greatest resistance is reached as the slit in the side wall of the piston reaches its outermost position upon the radial abutment and the center of the piston is nearest to said abutment and is passing the radial plane thereof, or, in other words when the piston reaches what is in some respects a dead center position such as shown in Fig. 9. To facilitate the movement of the piston at this point in its travel the present invention contemplates providing an inlet port so located in the measuring chamber casing and of such shape and size that the inflow of liquid to the outer sector of the measuring chamber will be cut off while the piston has still a substantial distance to travel before reaching the point of greatest resistance or the dead center position above referred to. As a result the pressure will be reduced in the outer measuring sector where if not reduced it would tend to oppose the continued movement of the piston. The inner measuring sector on the inlet or receiving side of the meter is not cut off from the inlet at this time and the pressure therein is relied upon to carry the piston by this critical point in its cycle. The theory is that the pressure in this inner sector will be sufficient to carry the center of the piston across the plane of the radial abutment if, at this time the movement of the piston is unopposed by pressure in the outer measuring sector.

In the present construction to effect the desired cutting-off from the inlet port of the outer receiving sector of the measuring chamber before the piston reaches the above described critical point in its travel, the inlet port 43 is made of the size and shape best shown in Figs. 2 and 4 so that the outer measuring sector A will be entirely cut off from the inlet port 43 when the piston reaches the position in which it is shown in Fig. 8. It will be seen by reference to said figure that the piston has still a substantial distance to travel before reaching the point of greatest resistance which is when the piston reaches the position in which it appears in Fig. 9. The head pressure of the liquid will therefore be cut off from the outer measuring sector until the piston has passed the position of greatest resistance with the result that the head pressure will not oppose the continued movement of the piston. The head pressure in the inner receiving sector B, which is still in communication with the inlet port 43, does not oppose the advance movement of the piston and is relied upon to move it from the position shown in Fig. 9 to the position shown in Fig. 8.

When the outer sector of the measuring chamber is thus abruptly cut off from the inlet port as above described the volume of liquid flowing through the meter is momentarily and suddenly reduced. As a result of thus abruptly checking the flow of the liquid, the piston would be subjected to sudden variation of pressure unless provision is made for preventing the same and such variation of pressure would tend to make the piston vibrate or flutter and thus subject the piston spindle to side strain and excessive wearing friction at its bearings.

To prevent such sudden variation of pressure within the measuring chamber of the meter an extremely sensitive diaphragm 88 is provided in the wall of the outer casing 8.

This diaphragm 88 may advantageously be constructed of thin copper or other flexible metal which will respond readily to slight variations of pressure. As shown in Fig. 1, the diaphragm 88 is arranged to extend across an opening 89 in the cylindrical wall of the outer casing 8 and is rigidly secured to the casing by a suitable clamping ring 90. To maintain the diaphragm normally in an inwardly flexed condition so that it will bulge outwardly upon a slight increase of pressure within the meter casing a leaf spring 91 is anchored at one end upon the clamping ring 90 while its opposite end is forked to straddle the outer end of a stud 92 which is secured to the center of the diaphragm 88 and projects outwardly therefrom. The outer end of the stud 92 is threaded to receive a nut 93 which provides an adjustable abutment to receive the inward pressure of the spring 91. By turning the nut 93 the pressure of the spring 91 against the diaphragm may be adjusted to vary the sensitiveness of the diaphragm to changes of pressure within the meter casing.

The liquid flowing through the meter follows the course indicated generally by the arrows in Fig. 5. The liquid enters the measuring chamber casing through the inlet port 43 in the bottom plate 33, and when the lower edge of the cylindrical wall of the piston crosses the inlet port a relatively small portion thereof is exposed to the influence of the inflowing liquid and the upward pressure exerted by the liquid upon the exposed portion of the piston wall needs to be counterbalanced by pressure upon a corresponding portion of the upper edge of said piston wall. For this purpose the portion of the top plate 32 is recessed directly above the inlet port, as indicated at 95 in Fig. 5, thus insuring that a body of liquid will be maintained above the piston wall to counterbalance the pressure of the liquid entering the inlet port.

Meters of the general type herein described have been provided heretofore with a pressure counterbalancing recess on the portion of the wall of the measuring chamber opposite the inlet port and it has been found, in practice that the counterbalancing action thus obtained has been more or less imperfect. In accordance with the present invention a portion of the pressure counterbalancing recess 95 has been provided with an inclined base or ramp 96 located relatively to the inlet port, as shown in Fig. 5, to cause this portion of said recess to gradually decrease in depth toward the edge thereof which is nearest the inlet spud 15. With this improved construction perfect counterbalancing of the pressure of the inflowing liquid upon the lower edge of the piston wall has been obtained. This is believed to be due to the fact that the liquid coming from the opening in the inlet spud 15 flows through the inlet port 43 substantially at the angle indicated by the arrows in Fig. 5 and as it flows at this angle past the perpendicular wall 97 of the inlet port, a low pressure area, indicated by the triangular shaded portion 98 will exist adjacent said wall. Heretofore the presence of such a low pressure area has not been taken into consideration in designing the counterbalancing recess and consequently the pressure of the incoming liquid has not been exactly counterbalanced and the piston has been subjected to an undesirable tilting movement creating frictional resistance to its movement. By providing the inclined base 96 in the recess 95 located, as shown and described, directly above the assumed low pressure area 98, absolutely perfect counterbalancing action is obtained so that the piston does not vibrate or flutter as a result of either of the impact or pressure of the inflowing current against the lower edge of the piston wall.

For ideal pressure counterbalancing purposes it is desirable that the body of liquid in the recess 95 should be maintained in as quiet a state as possible. It has been found, in practice, that the incoming current of liquid passes through the perforated piston web without being very much broken up or diverted by said web and as a result there is a more or less continuous flow of liquid into and out of said recess, the outflowing liquid being diverted downwardly toward the piston web so that it has a strong tendency to cause undesirable vibration of the piston.

To modify the action of the currents and adjacent the recess 95 and to break up the flow of liquid so as to eliminate any tendency to vibrate the piston, a barrier 100 is projected across the recess 95. One or more relief apertures or passages 102 are provided in barrier 100, these passages connecting the areas at opposite sides of the barrier to insure equal pressure therein. Without these passages 102 there might be a tendency for a slightly greater pressure to be built up in the smaller division of the recess inasmuch as this division is more nearly in the direct line of flow of the incoming liquid.

A pressure counterbalancing recess or depression 104 is provided in the portion of the bottom plate 33 which is directly beneath the outlet port 45 and which is in a general way similar to the counterbalancing recess 95 already described. A portion of this recess 104 is provided with a gradually sloping wall or ramp 105 over which the liquid flows in entering the recess. In certain meters of this type heretofore constructed a recess has been employed which is located similarly to the recess 104 but in the prior constructions so far as the inventor is aware, the recess has been entirely surrounded by edge walls which are perpendicular to the bottom wall thereof. It has been found in the use of meters having a counterbalancing recess with perpendicular edge walls that as the liquid flows suddenly over said walls in entering the recess, eddy currents or the like are set up which cause vibration of the piston. In the present construction the liquid flows smoothly without any appreciable agitation or churning action into the recess 104 and thus has no tendency to vibrate the piston.

The recesses 95 and 104 also serve to insure communication at all times between the inner and outer receiving sectors and between the inner and outer discharging sectors respectively. The recess 104 is connected with the outlet port 45 by means of two vertical grooves 106 which permit free escape of the liquid from the inner discharging sector below the piston web when said sector has contracted to such an extent that it is no longer in communication with the main portion of the recess 104 or with any of the apertures in the piston web.

The registering mechanism 28 is driven from the spindle 62 of the bearing-block thus reducing to a minimum the load upon the piston. To this end the spindle 62 has pinned thereto a worm 108 which meshes with a worm pinion 109 on a horizontal shaft 110. The shaft 110 is supported at one end in a pivot bearing 112 in the pedestal 20 and at the opposite end in a fixed pivot bearing 113. The bearing 112 comprises a stud which extends horizontally through the side of the pedestal 20 and has a conical bearing cup at its inner end to receive the conical end of the shaft 110. Both ends of the bearing stud 112 are screw-threaded to receive nuts 114, one bearing against the inner face of the hollow pedestal 20 and the other nut bearing against the outer face of the pedestal. These nuts 114 may be turned to move the bearing stud 112 toward or from the bearing 113 to attain proper adjustment of said bearings to the shaft 110. The bearing 113 is carried by a support or partition member 116 which is of a peculiar construction rendered necessary by the employment of a form of magnetic drive shortly to be described.

The partition member 116 has a cylindrical outer periphery which is fitted within a horizontally disposed sleeve 118 the outer end of which is fitted tightly within an aperture in the side of the outer casing 8, the sleeve 118 extending inwardly from the side of said casing to the pedestal 20. To insure a liquid-tight joint a portion of the inner end of the partition member is forced against an internal shoulder 119 on the sleeve 118 by means of a follower ring 120 which is screw-threaded into the outer end of the sleeve 118 and bears against a portion of the outer end of the partition member 118. The partition member 118 is shaped to provide two concentric annular chambers 122 and 123, the chamber 122 opening at its outer end to the exterior of the meter casing 8 and the chamber 123 opening at its inner end to the interior of said casing and said chambers being adapted to receive the driven and driving magnets respectively of a magnetic drive device which is constructed as follows.

Supported by the shaft 110 is a cup-like magnet carrier 125 composed of non-magnetic material such as brass and comprising a disk that is rigidly secured to said shaft and a pair of horizontal arms 126 (Fig. 6) which are segments of a cylindrical shell, these arms 126 being integral with said disk and extending from one side thereof. Between the arms 126 of the magnet carrier 125 are cylindrical segments 127 of hardened steel which are rigidly secured by screws 128 to the disk 125. Interposed between the disk 125 and the adjacent ends of the two segments 127 is a ring 129 which connects the segments. The segments 127 and the connecting ring are magnetized and constitute a single magnet similar in its general characteristics to an ordinary permanent horseshoe magnet. The segments 127 or arms of the magnet combine with arms 126 of the magnet carrier 125 to constitute a continuous cylindrical shell which is open at the end opposite the disk 125. The open end of this shell extends into the inner annular chamber 123 that is formed by the partition member 116 and is adapted to rotate freely therein in close proximity to the walls thereof but with a slight clearance between said shell and walls which is filled with liquid from the interior of the meter casing 8.

Mounted to rotate freely within the outer annular chamber 122 formed by the partition member 116 is a cylindrical shell similar to that just described which is mounted to rotate in the inner annular chamber 123. The rotatable shell in the outer chamber 122 comprises two diametrically disposed cylindrical segments 130 of hardened steel and two cylindrical segments 132 which are interposed bewcen the segments 130. The segments 132 are formed integrally with a supporting disk 134 of non-magnetic material and said disk and segments constitute a carrier for the segments 130. The segments 130 are secured to the carrier disk 134 by screws 135 and a hardened steel ring 136 is interposed between said segments and disk. The segments 130 together with the ring 136 which connects the segments, are magnetized and by virtue of their construction have the properties of a permanent horseshoe magnet. The carrier disk 134 is fixedly secured upon a horizontal shaft 138 which is mounted in axial alinement with the shaft 110 and is supported in fixed pivot bearings 139 and 140, the bearings 139 being supported by the central portion of the partition member 116 and preferably being formed integrally with the bearing 113, while the bearing 140 is carried by a vertical arm 142 of a bracket 143 that is secured to the outer casing of the meter. To obtain relative adjustment of the bearings 139 and 140 the arm 142 is adapted to be sprung by means of an adjusting screw 145 which engages said arm and is threaded through an upright portion 146 of the bracket 143.

From the above description it will be understood that the magnet comprising the inner segments 127 constitutes the driving magnet while the magnet comprising the outer segments 130 constitutes the driven magnet of the magnetic drive device and that as the driving magnet is rotated by the rotation of the bearing-block 27, the driven magnet will be caused to rotate in unison with the driving magnet although the wall separating the concentric annular chambers 122 and 123 is interposed between said magnets. The use of the magnetic drive avoids the necessity of passing the driving shaft 110 through a stuffing-box in the side wall of the meter casing which would cause more or less frictional resistance to the turning of said shaft. The present construction enabled the rotation of the driving shaft 110 to be transmitted to the exterior of the meter casing without subjecting said shaft to any additional frictional resistance and eliminates possibility of leakage of liquid such as might occur if a stuffing box were employed. By constructing the driving magnet and its support in such a way that the whole comprises a continuous cylindrical shell as described the rotation of the magnet and its support has practically no tendency to agitate or churn the liquid within the meter and consequently there is less hydraulic friction to oppose such rotation.

The rotation of the disk 134 which carries the driven magnet above described is transmitted frictionally to a vertical shaft 150 which is journaled in pivot bearings 151 and 152 in the bracket 142, the latter bearing being similar in construction to the bearing 112 previously described, and being adjustable in a similar manner. The shaft 150 is driven from the disk 134 by means of a friction disk 154 that is non-rotatably mounted on said shaft, this disk having its periphery in contact with the outer face of the driving disk 134. Preferably the face of the driving disk 134 is somewhat roughened and the driven disk is composed of cork to prevent slipping of the disks relatively to each other.

In order that the movements of the registering mechanism 28 may be accelerated or retarded to compensate for leakage as will be subsequently explained, the driven disk 154 is slidably mounted upon the shaft 150 to vary the speed of said shaft. To this end the shaft 150 is made square in cross-section and the disk 154 is provided with a hub 155 having an axial opening which is also square in cross-section to receive said shaft. The disk 154 is maintained in adjusted position upon the shaft 150 by means of a yoke 156 which engages in an annular groove in the hub 155 and is supported and actuated to slide said disk by means hereinafter described.

Figure 3:
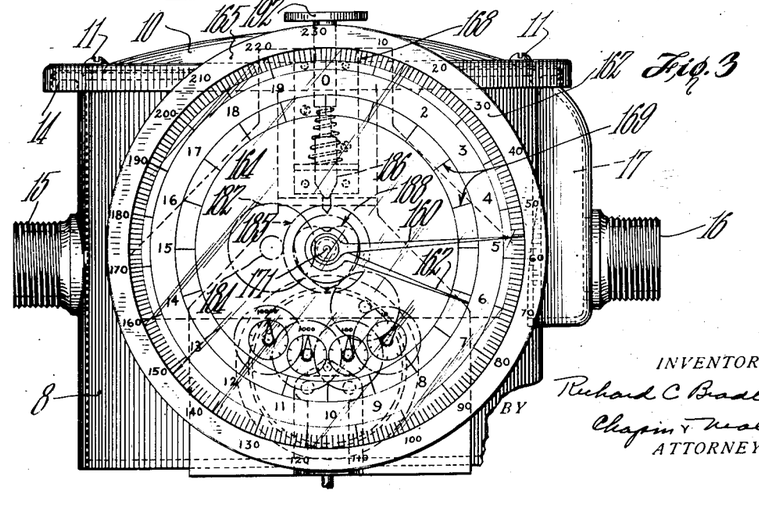
Fig. 3 is a front elevational view of the meter.

The registering mechanism 28 does not in itself constitute any portion of the present invention and will therefore be only briefly described. The indicating members of the registering mechanism comprise two hands or pointers 160 and 161 which move in front of a dial 162 (Fig. 3). The dial 162 and the pointers 160 and 161 are protected by a casing 163 having a glass front 164, the latter being secured to the casing 163 by a suitable annular ferrule 165 and the said casing being suitably supported by a bracket 166 that is secured to the meter casing. The pointer 160 cooperates with graduations 168 (Fig. 3) upon the dial 162 to register in cubic inches fractional parts of gallons, while the pointer 161 cooperates with graduations 169 upon said dial to register in gallons the quantities of liquid measured at different times. The pointer 160 is carried by a sleeve 170 which is frictioned upon a horizontal shaft 171 that is journaled in a bearing 172 in the bracket 143. Secured to the shaft 171, at the end nearer the meter casing, is a bevel pinion 173 which meshes with a similar bevel pinion 174 that is secured upon the driven friction disk shaft 150. The other pointer 161 is carried by a sleeve 176 which telescopes upon the sleeve 170 and is journaled in a bearing 177 supported by the bracket 166 and is adapted to be driven by a collar 178 that is frictioned on said sleeve. Rotation imparted to the shaft 171 is transmitted frictionally through the sleeve 170 directly to the pointer 160, while said rotation is imparted to the pointer 161 through reduction gearing that is interposed between the shaft and the sleeve 176. This reduction gearing comprises a gear 180 that is pinned to the shaft 171, a pinion 181 compounded with said gear, a gear 182 on a counter-shaft 183 (Fig. 2) which is driven by said pinion, a pinion 184 on said counter-shaft, and a gear 185 that is secured to the collar 178 and is driven by the pinion on said countershaft.

After each measurement has been registered by the pointers 160 and 161, said pointers are adapted to be reset to zero position by means of a vertical resetting plunger 186 which cooperates with two heart-shaped cams 187 and 188 that are rigidly secured upon the sleeves 170 and 176, respectively. The cams 187 and 188 are so set upon their respective sleeves that when both pointers 160 and 161 are registering zero, the lowest points in the peripheries of the two cams will be uppermost, in which position they appear in Fig. 1. The plunger 186 is supported and guided in bearings in two spaced-apart horizontal portions of the bracket 166 and is normally held in an elevated or inoperative position by the action of a suitably arranged spring 190, said position of the plunger being determined by the engagement of a stop pin 191 with the adjacent portion of the bracket 166. Above the bracket 166, the resetting plunger is provided with a head or push button 192. The plunger 186 has a tapered lower edge which is adapted to engage the peripheries of both cams 187 and 188. When the plunger is depressed, if the pointers 160 and 161 have been moved so that the cams have been turned from home position, the plunger 186 will engage the higher portions of the cam peripheries causing the cams to revolve until the notches representing the lowest portions of said cams engage with said plungers the cams having then been returned to home position and the pointers to zero.

In order that a record may be kept of the total quantity of liquid measured for an extended period of time, a totalizing device 194 is provided. The totalizing device 194 comprises a counter mechanism which may be of any standard commercial construction. As shown, the totalizing device is driven from the gear 180 through a gear 195 which is fast upon a shaft 196 that is geared to said counter mechanism.

To insure that the registration of the totalizing mechanism shall not be interfered with by the resetting operation the present invention contemplates the provision of a locking finger 198 which is adapted to be moved automatically into engagement with one of the teeth of the gear 180 when the resetting plunger is depressed thereby locking said gear against rotation and consequently preventing movement of the totalizing mechanism. As shown in Fig. 1, the locking finger 198 is supported in guideways in the upper and lower horizontal portions of the bracket 166. Normally the locking finger is yieldingly maintained in its uppermost position by a spring 200 which is coiled thereabout, the spring bearing against the lower portion of the bracket 166 and against a shoulder formed at the base of an enlarged upper portion 201 of the locking finger. The enlarged portion 201 is axially recessed to receive a coiled spring 202, the lower end of which is seated against the base of the recess. The upper end of the spring 202 is engaged by the lower end of a stud 203 which depends from the push button 192 on the resetting plunger and projects into the recess in the enlarged portion 201 of the locking finger 198. The spring 202 is stronger than the spring 200 and when the resetting plunger is depressed the spring 202 will not yield until the spring 200 has been compressed and the locking finger 198 has engaged between the teeth of the gear 180 to prevent the same from rotating. Thereafter the spring 202 yields to permit the downward movement of the resetting plunger to continue so that it may properly perform its function. Upon the release of the resetting plunger 186 it will be retured to normal position by its spring 190 and before reaching said position the spring 202 will become sufficiently expanded to permit the spring 200 to expand also, thereby disengaging the locking finger 198 from the gear 180 and leaving the totalizing mechanism free to operate. It will be seen that by means of the present construction the totalizing mechanism will necessarily be locked before the registering mechanism 28 can be reset and consequently there is no danger of the totalizing counters being actuated by the resetting operation. Also when the resetting of the registering mechanism has been completed the means for locking the totalizing mechanism will be automatically released so that said mechanism will be restored to operative condition.

As before stated, the present meter has been designed to obviate leakage of liquid from the receiving to the discharging compartments of the measuring chamber within certain limits of head pressure and thus to prevent such liquid from passing through the meter without being measured. To enable the meter to measure accurately in the event that the head pressure of the liquid passing through the meter should exceed said limits of pressure provision has been made for compensating for such leakage by accelerating the speed of the registering mechanism as the head pressure above said limits increases and retarding the speed of the registering mechanism as the head pressure above said limits decreases. To this end an opening 205 is cut in the bottom wall of the outer casing 8 of the meter and a flexible diaphragm 206 has been placed across the opening, the marginal portion of the diaphragm being secured to the casing by a clamping ring 207 so as to form a liquid-tight joint between the casing and the diaphragm. Projecting from the center of the diaphragm 206 is a stud suitably secured thereto and this stud is pivotally connected to one end of a lever 209 that is fulcrumed intermediate its ends upon a bracket 210 that is secured to the meter casing 8. The opposite end of the lever 209 is connected by a rod 211 with the yoke 156 that is arranged to slide the driven friction disk 154 upon the vertical shaft 150. The diaphragm 206 is adapted to bulge outwardly as the head pressure of the liquid increases beyond the limits above mentioned and to move inwardly as such excess of pressure is reduced. Thus as the head pressure rises beyond said limit and the diaphragm 206 bulges outwardly, the lever 209 will be rocked in a direction to raise the yoke 156 and consequently to slide the driven friction disk 154 upwardly on the shaft 150 or, in other words, away from the center of the driving friction disk 134. As a result of this movement of the disk 154 a higher speed will be imparted to said disk and the movement of the registering mechanism will be accelerated to compensate for the liquid which has leaked by the piston and consequently has passed through the meter without being measured. As said excess head pressure falls, the diaphragm 206 will respond by moving inwardly, thus rocking the lever 209 to lower the yoke 156, and consequently to move the driven friction disk 154 inwardly toward the center of the driving disk 134 to lessen its speed of rotation and thus to retard the movements of the registering mechanism to compensate for the decrease in the leakage of the liquid. While the sliding adjustment of the driven disk 154 has been illustrated and described as being automatically effected by change of pressure within the meter casing it is obvious that provision may be made readily whereby such adjustment may be effected manually.

The invention has been disclosed herein for illustrative purposes in an embodiment at present preferred but it is to be understood that the scope of the invention is defined by the appended claims rather than by the foregoing description.

The invention having been described, what is claimed and desired to secure by Letters Patent is:—

1. In a liquid meter, an annular measuring chamber, a hollow cylindrical piston having its side wall confined in said chamber, an axial spindle, a piston web supported by the piston and transverse to the spindle and carrying the spindle, a crank-disk having an eccentric pivot bearing for the lower end of said spindle, a journal bearing vertically spaced from the pivot bearing for the upper portion of the spindle, an axial spindle supporting the crank-disk, a fixed pivot bearing coaxial with the measuring chamber for the lower end of the crank-disk spindle, and a second bearing for said spindle vertically spaced from said pivot bearing.

2. In a fluid meter having a piston chamber and a piston movable therein, the combination of a rotatable bearing-block upon which said piston is eccentrically mounted, a vertical spindle depending centrally from said bearing-block and extending through a bearing in the wall of said chamber, a fixed bearing member outside of said chamber for supporting said spindle, registering mechanism, means connected with said spindle below said chamber for transmitting the rotations of the spindle to said registering mechanism, said means including a variable speed transmission device, and means for automatically varying the action of said device to compensate for leakage caused by variations in head pressure of the fluid.

3. In a liquid meter, a meter casing having inlet and outlet ports, a measuring chamber within said casing, a piston movable within said chamber, registering mechanism, a variable speed device for driving said registering mechanism, operative connections between said driving device and said piston, a rotatable bearing-block actuated by the piston, means for pivotally mounting the piston upon said bearing-block, a central spindle rigidly secured to said bearing-block and depending therefrom a bearing for said spindle adjacent its point of connection with said bearing-block, a pivot bearing for the lower end of said spindle a counter-shaft, worm gearing between said spindle and shaft, and driving connections between said shaft and the registering mechanism.

4. In a liquid meter wherein an annular measuring chamber is provided with a hollow cylindrical piston having an eccentric movement combined with a movement of oscillation within said chamber, means for supporting the piston to maintain a clearance between said piston and the walls of said measuring chamber sufficient to insure against frictional contact of said parts but insufficient to permit leakage of liquid of a certain viscosity within a certain range of head pressure, and means for compensating for leakage of liquid caused by an excess of head pressure.

5. In a fluid meter, a meter casing having inlet and outlet ports, a measuring chamber within said casing, a piston movable within said chamber, registering mechanism, a variable speed device for driving said registering mechanism, operative connections between said driving device and said piston, a flexible diaphragm in the wall of said meter casing responsive to changes of pressure of the liquid therein, and connections between said diaphragm and said driving device for varying the operation of the latter in accordance with movements of said diaphragm to compensate for leakage in the measuring chamber.

6. In a fluid meter the combination with an outer casing of an inner casing, a piston chamber within said inner casing, a piston movable therein, a crank disk upon which said piston is eccentrically mounted, a vertical spindle to the upper end of which said disk is secured, said spindle extending through a bearing in said inner casing, a fixed pivot bearing member outside of said inner casing for supporting said spindle, registering mechanism, and mechanism connected with said spindle below said inner casing for transmitting the rotations of said bearing member to said registering mechanism, said means including a variable speed transmission device, a flexible diaphragm in the wall of the meter casing and connections between said diaphragm and said variable speed transmission device operative to vary the action of the latter to compensate for variations in head pressure of the fluid.

7. In a fluid meter the combination with an outer casing of an inner casing, a piston chamber within said inner casing, a piston movable therein, a crank disk upon which said piston is eccentrically mounted, a vertical spindle to the upper end of which said disk is secured, said spindle extending through a bearing in said inner casing, a fixed pivot bearing member outside of said inner casing for supporting said spindle, registering mechanism, and mechanism connected with said spindle below said inner casing for transmitting the rotations of said bearing member to said registering mechanism, including a friction-disk driven by said spindle and having a flat friction driving face a second disk having its periphery in contact with said face, said second disk being so disposed as to be rotated by the rotation of said friction disk and being adjustable toward and from the center of the first disk to vary the speed of transmission, and means including a flexible diaphragm responsive to changes of head pressure of the fluid being measured for varying the position of the second disk relatively to the center of the first disk.

8. In a fluid meter the combination with an annular measuring chamber having inlet and outlet ports, a radial abutment between said ports, and an eccentrically movable hollow cylindrical piston radially slotted to receive said abutment and operative in conjunction with said abutment to divide said chamber into receiving and discharging spaces severally connected with and disconnected from said inlet and outlet ports respectively at each cycle of operations of said piston, of a flexible diaphragm responsive to excess fluid pressure periodically produced by the disconnection of one of said receiving spaces from said inlet port and operative to relieve the piston from said pressure.

9. In a fluid meter the combination with the meter casing of a measuring chamber having inlet and outlet ports, a piston dividing said chamber into receiving and discharging compartments and movable in said chamber to measure the fluid passing therethrough, a diaphragm in the wall of said casing adapted to yield outwardly upon a momentary rise of pressure within said chamber to relieve the piston of said pressure, and adjustable means opposing the expansion of the diaphragm for regulating the sensitiveness of the same to changes of pressure.

10. In a liquid meter the combination of an annular measuring chamber having inlet and outlet ports. a radial abutment between said ports, a hollow cylindrical piston within said chamber having its side wall slit to straddle said abutment, said piston cooperating with the walls of said chamber and with said abutment to divide said chamber into inner and outer receiving sectors and inner and outer discharging sectors, and means for supporting said piston and for guiding it to move eccentrically within said chamber as the liquid flows therethrough, said inlet port being shaped and located to cut off communication between said inlet port and the outer receiving sector of the measuring chamber at such a time that the center of the piston has still a substantial distance to travel before reaching that point in its orbit which is nearest to said abutment.

11. In a liquid meter the combination of an annular measuring chamber having inlet and outlet ports, a radial abutment between said ports, a hollow cylindrical piston within said chamber having its side wall slit to straddle said abutment, said piston cooperating with the walls of said chamber and with said abutment to divide said chamber into inner and outer receiving sectors and inner and outer discharging sectors, means for supporting said piston and for guiding it to move eccentrically within said chamber as the liquid flows therethrough, said inlet port being shaped and located to cut off communication between said inlet port and the outer receiving sector of the measuring chamber at such a time that the center of the piston has still a substantial distance to travel before reaching that point in its orbit which is nearest to said abutment, and means for relieving the piston from the excess of liquid pressure produced by said cut off action.

12. In a liquid meter the combination with the meter casing of an annular measuring chamber having inlet and outlet ports, a radial abutment between said ports, a hollow cylindrical piston within said chamber having its side wall slit to straddle said abutment, said piston cooperating with the walls of said chamber and with said abutment to divide chamber into inner and outer receiving sectors and inner and outer discharging sectors, means for supporting said piston and for guiding it to move eccentrically within said chamber as the liquid flows therethrough, said inlet port being shaped and located to cut off communication between said inlet port and the outer receiving sector of the measuring chamber at such a time that the center of the piston has still a substantial distance to travel before reaching that point in its orbit which is nearest to said abutment, and a flexible diaphragm in the wall of the meter casing adapted to yield outwardly under the influence of the rise in liquid pressure within said casing produced by said cutting-off action to relieve the piston from said increased pressure.

13. In a liquid meter the combination of an annular measuring chamber having an inlet port in one end wall thereof, an outlet port, and a pressure-counterbalancing recess opposite said inlet port in the other end wall of said chamber; and an eccentrically movable hollow cylindrical piston within said chamber having its annular end faces opposed to the end walls of said chamber, said counterbalancing recess having a portion gradually decreasing in depth to accommodate a body of liquid proportioned to counterbalance accurately the liquid pressure upon that portion of the annular end face of said piston which is caused by the inflow of liquid diagonally through said inlet port.

14. In a liquid meter the combination of an annular measuring chamber having an inlet port in one end wall thereof, an outlet port, and a pressure-counterbalancing recess opposite said inlet port in the other end wall of said chamber; and an eccentrically movable hollow cylindrical piston within said chamber having its annular end faces opposed to the end walls of said chamber, said counterbalancing recess having a barrier extending thereacross provided with a relief aperture for equalizing the pressure at opposite sides of said barrier.

15. In a liquid meter the combination of an annular measuring chamber having an inlet port, an outlet port located in one of the end walls of said chamber, and a pressure-counterbalancing recess opposite said outlet port in the other end wall of said chamber; and an eccentrically movable hollow cylindrical piston within said chamber having its annular end faces opposed to the end walls of said chamber, a portion of said recess having an inclined base across which the liquid flows in entering said recess said portion of said recess enabling the liquid to flow without substantial agitation in entering said recess.

16. In a liquid meter, a casing having an annular measuring chamber formed therein, said chamber having its inner side walls transversely slotted, a hollow cylindrical piston having its side wall confined in said chamber with its end faces opposed to the end walls of the chamber, a transverse piston web extending through said slotted side wall, a recess in said casing within the inner wall of said chamber and below said piston web, a cylindrical bearing block rotatable in said recess, an axial spindle depending from said web, an eccentric bearing for said spindle in said block, said block being hollow to lighten its weight and having an axial opening in one end wall to permit liquid entering the interior of said block by way of said bearing to flow into said recess.

17. In a liquid meter, a casing having an annular measuring chamber formed therein, said chamber having its inner side wall transversely slotted, a hollow cylindrical piston having its side wall confined in said chamber with its end faces opposed to the end walls of the chamber, a transverse piston web extending through said slotted side wall, a recess in said casing within the inner wall of said chamber and below said piston web, a cylindrical bearing block rotatable in said recess, an axial spindle depending from said web, an eccentric bearing for said spindle in said block, said block being hollow to lighten its weight and having an axial opening in the bottom end wall thereof to permit liquid entering the interior of said block by way of said bearing to flow into said recess, and a vent opening in the top wall of said block to prevent air from being trapped inside of said block.

In testimony whereof I have affixed my signature.

RICHARD C. BRADLEY.